United States Patent [19]

Ono et al.

[11] Patent Number: 5,036,504
[45] Date of Patent: Jul. 30, 1991

[54] OPTICAL HEAD USING A REFLECTION GRATING

[75] Inventors: Yuzo Ono; Akitomo Ohba; Yasuo Kimura, all of Tokyo, Japan

[73] Assignee: NEC Corporation, Tokyo, Japan

[21] Appl. No.: 277,735

[22] Filed: Nov. 30, 1988

[30] Foreign Application Priority Data

Nov. 30, 1987 [JP] Japan .................................. 62-303529
Jun. 29, 1988 [JP] Japan .................................. 63-164024

[51] Int. Cl.$^5$ .............................................. G11B 7/00
[52] U.S. Cl. .................................................. 369/44.12
[58] Field of Search .................... 369/112, 120, 44.12, 369/44.24, 121, 122, 44.11; 250/201.5

[56] References Cited

U.S. PATENT DOCUMENTS

| | | | |
|---|---|---|---|
| 4,665,310 | 5/1987 | Heemskerk | 369/44.12 |
| 4,731,772 | 3/1988 | Lee | 369/112 |
| 4,733,065 | 3/1988 | Hoshi et al. | 369/44.12 |
| 4,753,513 | 6/1988 | Shikama | 369/112 |
| 4,768,183 | 8/1988 | Ohnishi et al. | 369/112 |
| 4,885,734 | 12/1989 | Yuzo | 369/120 |
| 4,945,529 | 7/1990 | Ono et al. | 369/44.11 |

Primary Examiner—Donald McElheny, Jr.
Attorney, Agent, or Firm—Sughrue, Mion, Zinn, Macpeak & Seas

[57] ABSTRACT

An optical head includes a reflection type grating lens for dividing specified polarized lights into a reflected light and a diffracted light, a device for detecting a RF signal from the reflected light of the grating lens, and a device for detecting focusing and tracking error signals from the diffracted light of the grating lens. The grating lens consists of a plurality of domains having different optical properties respectively, so that the reflected and diffracted lights are obtained. The optical head further includes a total reflection prism to compensate a phase difference between polarized lights orthogonal to a grating groove of the grating lens and parallel thereto, and a polarizing prism for dividing the reflected light into two polarized lights orthogonal to each other in polarization thereof. Thus, a simple, miniaturized, and inexpensive optical head is obtained.

7 Claims, 11 Drawing Sheets

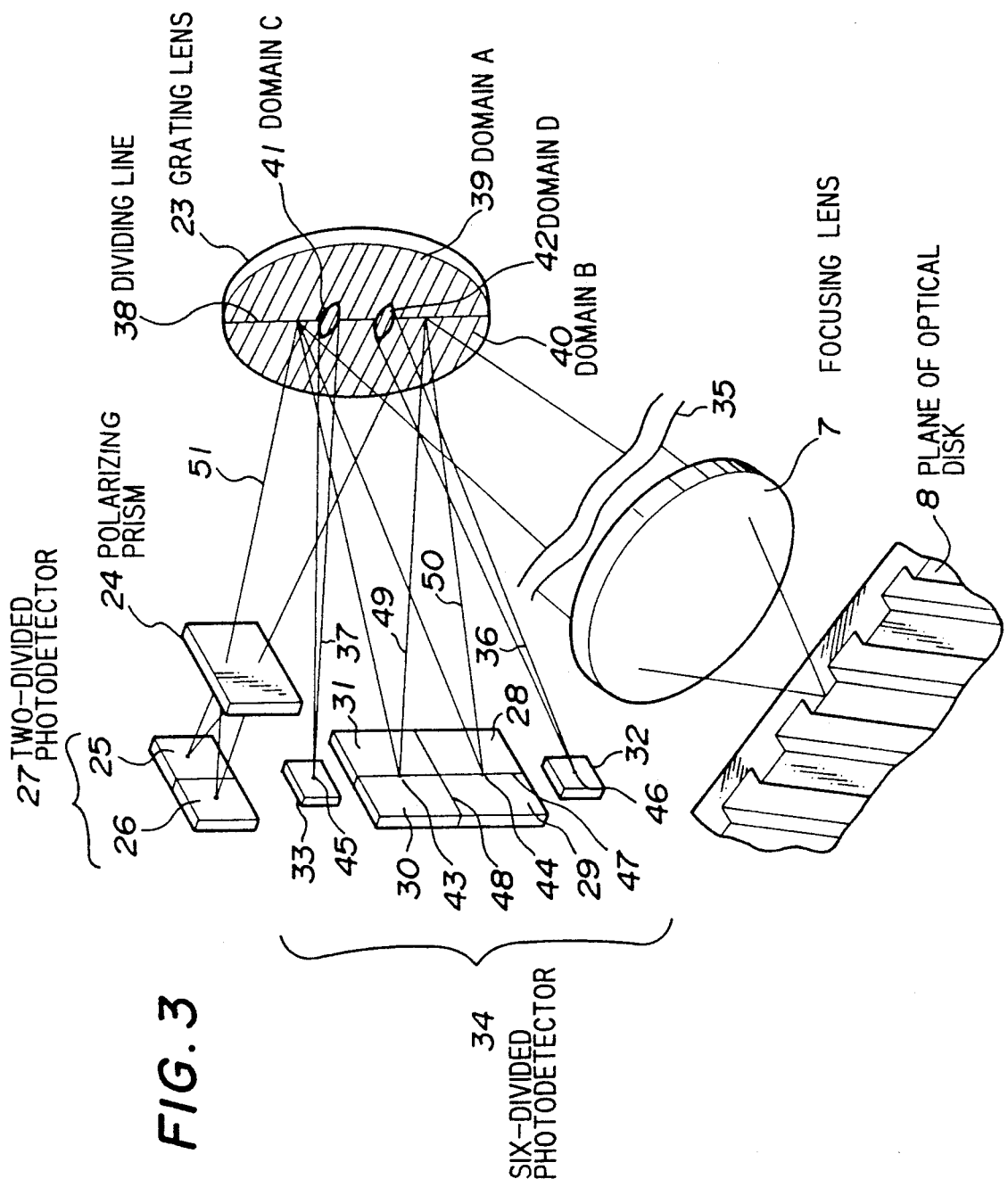

GRATING LENS

GRATING LENS

OPTICAL HEAD USING A REFLECTION GRATING

FIELD OF THE INVENTION

The present invention relates to an optical head by which informations are recorded into and read out of a recording medium such as an optical disk, magnetooptical disk, etc.

BACKGROUND OF THE INVENTION

One conventional optical head comprises a collimating lens for collimating laser beam radiated from a semiconductor laser, a beam splitter for transmitting the laser beam therethrough and for reflecting beam reflected from an optical disk, a total reflection prism for reflecting the beam transmitted through the beam splitter and the optical disk-reflected beam to bend a light path thereof by 90°, a first focusing lens for focusing the beam on the optical disk, a ½ wavelength plate for rotating a polarization of the beam reflected from the beam splitter by 90°, a second focusing lens for focusing the beam transmitted through the ½ wavelength plate, a polarizing beam splitter for transmitting and reflecting the beam focused by the second focusing lens to produce two beams having polarizations orthogonal to each other, a two-divided photodetector for receiving the beam transmitted through the polarizing beam splitter, a cylindrical lens for transmitting the beam reflected by the polarizing beam splitter to produce beam of astigmatism wave surface, and a four-divided photodetector for receiving the astigmatism wave surface beam.

In the conventional optical head, a tracking error is detected in a push-pull method by using signals of the two-divided photodetector, a focusing error is detected in an astigmatism method by using signals of the four-divided photodetector, and a RF signals are obtained in accordance with a predetermined calculation based on the signals of the two and four-divided photodetectors, although the details thereof and operation will be explained in more detail later.

However, the conventional optical head has a relatively large size, for example, greater than $40 \times 40 \times 30$ mm$^2$, and thus this prevents miniaturization and lightening of the entire optical disk system.

Further, a push-pull method has generally been utilized for detecting a tracking error. Therefore, when the first focusing lens is moved in the direction normal to its optical axis by means of an actuator on the basis of the tracking error signals, the deviation may arise between the optical axis of the first focusing lens and the dividing line of the two-divided photodetector for detecting the tracking error to induce the imbalance between two quantities of light which are incident to two photodetector elements respectively. As a result, a direct current offset is generated in the tracking error signals, thereby resulting in a limited range of the tracking error controlling.

Furthermore, there is the interference among a RF signal, a focusing error signal and a tracking error signal to cause a servomotor to be unstable.

In addition, such a conventional optical head has a number of optical parts required to be optically polished, and thus this is expensive and their adjustments are complex and cumbersome.

SUMMARY OF THE INVENTION

Accordingly, it is an object of the invention to provide an optical head of which construction is simple.

It is a still further object of the invention to provide an optical head which is inexpensive.

It is a yet still further object of the invention to provide an optical head in which the aforementioned drawbacks are overcome.

According to the invention, an optical head that reads, records, or erases information on a disk comprises means for radiating a laser beam; a beam splitter for transmitting the laser beam and reflecting a beam reflected from the disk; a focusing lens for focusing the laser beam on the disk; a reflection type grating device for dividing the beam reflected from the disk into reflected beam and diffracted beams, the reflection type grating device consisting of a plurality of domains having different polarization dependencies respectively, means for detecting a RF signal in accordance with the reflected beam from the reflection type grating device; and means for detecting a focusing error signal and a tracking error signal from the diffracted beam of the reflection type grating device.

In another feature of the invention, the optical head further comprises a total reflection prism for compensating a phase difference between polarized beams which are incident to the means for detecting the RF signal, and this total reflection prism is provided between the disk and a polarizing prism to be positioned on an optical axis of the beam reflected from the disk, the polarizing prism being positioned between the reflection type grating device and the means for detecting the RF signal.

BRIEF DESCRIPTION OF THE DRAWINGS

The invention will be described in more detail in conjunction with following drawings wherein, FIG. 3 is a partially enlarged perspective view of the first embodiment shown in FIG. 2, FIGS. 4A to 4C are explanatory views showing the states of diffracted beams on a six-divided photodetector, respectively.

DESCRIPTION OF THE PREFERRED EMBODIMENTS

Before explaining an optical head in embodiments according to the invention, a conventional optical head as briefly explained hereinbefore will be described.

Figure 1:
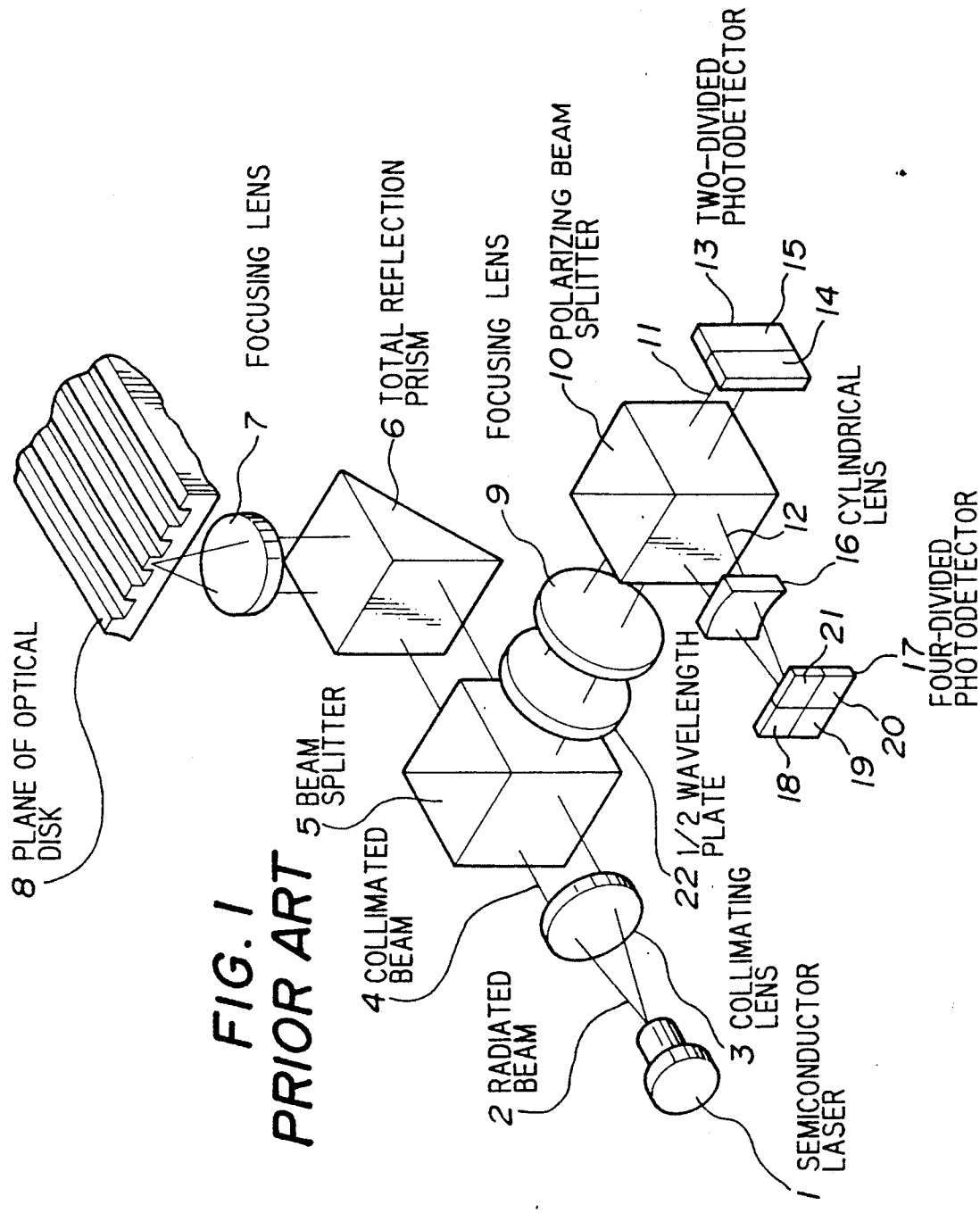
FIG. 1 is a perspective view showing a conventional optical head.

FIG. 1 shows a conventional optical head. In FIG. 1, a laser beam 2 radiated from a semiconductor laser 1 is collimated as collimated beam 4 by a collimating lens 3, the beam 4 is transmitted through a beam splitter 5, the transmitted beam is reflected by a total reflection prism 6 to bend a light path of the reflected beam by an angle of 90°, and the reflected beam is then focused onto the surface of a disk 8 by a first focusing lens 7. The beam reflected from the surface of the disk 8 is propagated in the reverse direction and then is reflected by the beam splitter 5. After the rotation of polarization by 90° in a ½ wavelength plate 22, the reflected beam is focused by a second focusing lens 9, and then the focused beam is divided, by a polarizing beam splitter 10, into a transmitted beam 11 and a reflected beam 12, polarizations of which are orthogonal to each other. The transmitted beam 11 is received in a two-divided photodetector 13 in which a tracking error signal can be obtained from the subtraction between two signals of photodetector elements 14 and 15.

On the other hand, the reflected beam 12 is passed through a cylindrical lens 16 to form an astigmatism wave surface and then is received in a four-divided photodetector 17 in which a focusing error signal can be obtained by an astigmatism method. That is, when the output voltages of photodetector elements 18, 19, 20 and 21 in the four-divided photodetector 17 are $V_{18}$, $V_{19}$, $V_{20}$ and $V_{21}$ respectively, the focusing error signal can be obtained in the equation of $V_{18}+V_{20}-V_{19}-V_{21}$. A RF signal can be obtained from the subtraction between the intensities of two polarized beams divided by the polarizing beam splitter 10, polarizations of which are orthogonal to each other. This means that, when the output voltages of the photodetector elements 14 and 15 are $V_{14}$ and $V_{15}$ respectively, the RF signal can be obtained in the equation of $V_{14}+V_{15}-V_{18}-V_{19}-V_{20}-V_{21}$.

Next, the embodiments of the present invention will be described hereinafter.

Figure 2:
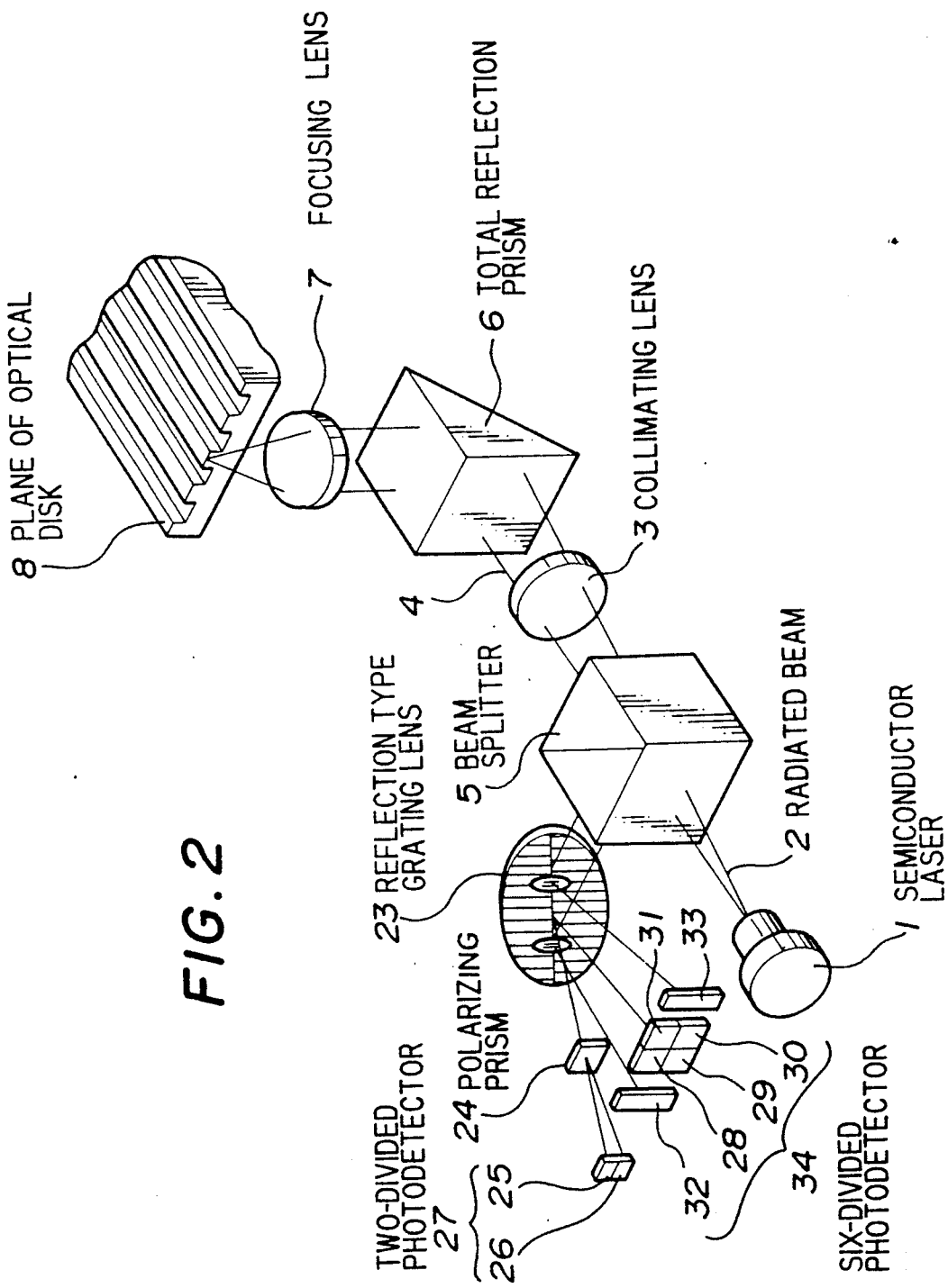
FIG. 2 is a perspective view showing an optical head in a first embodiment according to the invention.

FIG. 2 is a perspective view showing the basic construction of a first embodiment according to the present invention. In FIG. 2, the laser beam 2 radiated from a semiconductor laser 1 is transmitted through a beam splitter 5, the transmitted beam is collimated as a collimated beam 4 by a collimating lens 3, the collimated beam 4 is subject to total reflection by a total reflection prism 6, so that a light path of the reflected beam is bent by an angle of 90°, and then the reflected beam is focused on the surface of an optical or magnetooptical disk 8 by a focusing lens 7. The beam reflected from the surface of the disk 8 follows the light path as described above in the reverse direction thereof, the beam is focused by the collimating lens 3, and the focused beam is reflected by the beam splitter 5. The reflected beam is diffracted by a reflection type grating lens 23 and the diffracted beam is received in a six-divided photodetector 34 comprising photodetector elements or devices 28 to 33. The zero-order diffracted beam is reflected from the reflection type grating lens 23, and then divided into two polarized beams orthogonal to each other in polarizations by a polarizing prism 24 and the polarized beams are received in a two-divided photodetector 27 comprising photodetector elements 25 and 26. The grating lens 23 is provided with gratings having a pitch defined by $\lambda/d=0.5$ to be explained in FIG. 7 later and is arranged in such a way that a signal polarized light from the disk 8 becomes S-polarized light. Therefore, nearly 100% of the signal polarized light can reach an optical signal receiving system consisting of the polarizing prism 24 and the two-divided photodetector 27 and thus a high S/N ratio can be obtained. When P-polarized light as a signal component is used for the reflection type grating lens 23, a ¼ wavelength plate is disposed between the beam splitter 5 and the reflection type grating lens 23 to rotate the direction of polarization by 90°.

FIG. 3 is a partially enlarged perspective view showing the relationship between the reflection type grating lens 23 and the six-divided photodetector 27 as shown in FIG. 1. In FIG. 3, there are shown the focusing lens 7 and the disk 8 by use of cut-off lines 35 so as to show the directional relationship between four domains on the grating lens 23 and tracks provided on the disk 8.

The reflection type grating lens 23 consists of A or a first domain 39, B or a second domain 40, C or a third domain 41 and D or a fourth domain 42. The domains A and B which are different from each other in focal length and direction of diffraction are bounded by a dividing line 38 intersecting an optical axis of the collimating lens 3. The domains C and D which are different from the domains A and B in focal length and direction of diffraction are formed on the dividing line 38. The reflection type grating lens 39 of the domain A has a grating pattern corresponding to interference fringes produced by an interference between a spherical wave reflected on the plane of the grating lens 39 and is focused on a focal point of the zero-order diffraction light 51 and a spherical wave diverging from a point 43 on a first dividing line 47 of the six-divided photodetector 34. The reflection type grating lens 40 of the domain B has a grating pattern corresponding to interference fringes produced by an interference between a spherical wave reflected on the plane of the grating lens 40 and is focused to a focal point of the zero-order diffraction light 51 and a spherical wave diverging from a point 44 on the dividing line 47. The reflecting type grating lens 41 of the domain C has a grating pattern corresponding to interference fringes produced by an interference between a spherical wave reflected on the plane of the grating lens 41 and is focused to a focal point of the zero-order diffraction light 51 and a spherical wave diverging from a point 45 on a photodetector element 33 of the six-divided photodetector 34. The reflection type grating lens 42 of the domain D has a grating pattern corresponding to interference fringes produced by an interference between a spherical wave reflected on the plane of the grating lens 42 and is focused to a focal point of the zero-order diffraction light 51 and a spherical wave diverging from a point 46 on a photodetector element 32 of the six-divided photodetector 34. As such a grating lens 23 is used, light which is reflected from the disk 8 and is then incident to the reflection type grating lens 23 is focused to the points 43, 44, 45 and 46 on the six-divided photodetector 34 as diffracted beams 49, 50, 36 and 37 respectively. The zero-order diffraction beam which is not subject to the diffraction is divided to two polarized beams by a polarizing prism 24, and the two polarized beams are focused on the photodetector elements 25 and 26 of the two-divided photodetector 27. A RF signal can be obtained from a differential signal between the two photodetector elements 25 and 26.

Figures 4A, 4B, 4C:
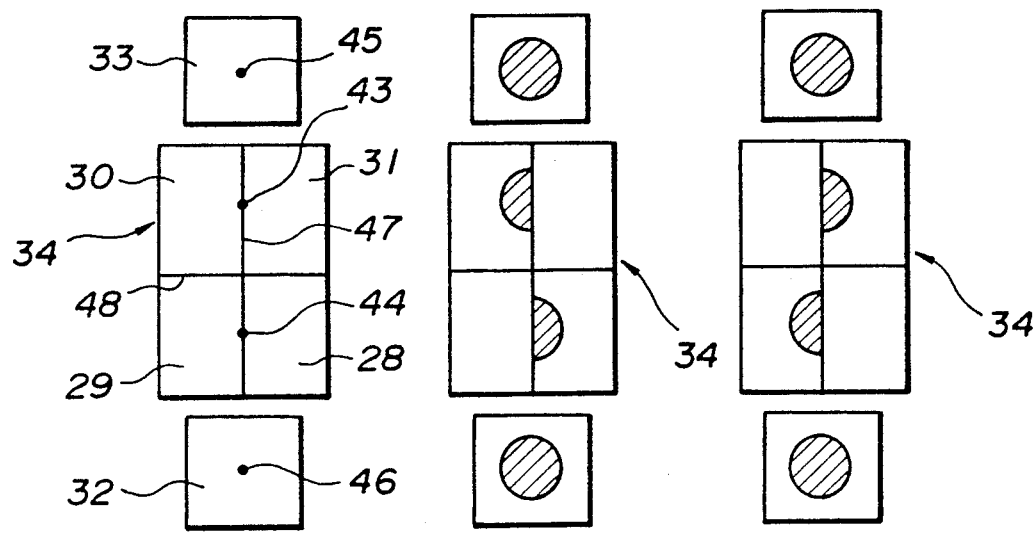

FIGS. 4A, 4B and 4C show the states of diffracted beams on the six-divided photodetector 34. FIG. 4A shows a focused state in which beams are focused on the disk 8. The beam 49 diffracted from the reflection type grating lens 39 of the domain A and the beam 50 diffracted from the reflection type grating lens 40 of the domain B are focused on a first dividing line 47 and on the opposite sides of a second dividing line 48 respectively. FIG. 4B shows a defocused state in which the disk 8 is positioned on a longer distance than the focused state from the focusing lens 7. In this state, the diffracted beams 49 and 50 are incident to photodetector elements 30 and 28 of the six-divided photodetector 34 respectively, but they are not incident to the photodetector elements 31 and 29. FIG. 4C shows a defocused state in which the disk 8 is positioned closer than the focused state to the focusing lens 7. The diffracted beams 49 and 50 are incident to the photodetector elements 31 and 29 of the six-divided photodetector 34 respectively, but they are not incident to the photodetector elements 30 and 28. Therefore, if the outputs of the central four photodetector elements 31, 28, 30 and 29 in the six-divided photodetector 34 are $S_1$, $S_2$, $S_3$ and $S_4$ respectively, the focusing error signal can be obtained in the equation, $(S_1+S_4)-(S_2+S_3)$.

On the other hand, a tracking error signal can be obtained by utilizing the imbalance in intensity distributions of the reflected lights in a case where a spot focused on the disk 8 is deviated from the center of a track. That is, the grating lens 23 is set in such an arrangement that the line connecting the centers of the reflection type grating lenses 41 and 42 of the domains C and D includes the point at which an optical axis of the focusing lens 7 intersects with the grating lens, and is parallel to the direction of a tracking error on the disk 8. When a tracking error is induced, there is a difference between two quantities of lights received in the domains C and D. The difference in quantities of lights can be detected as an output difference between the two photodetector elements 32 and 33 of the six-divided photodetector 34, and the direction of the tracking error can also be detected depending on whether a resulting signal is positive or negative.

In detection of such focusing and tracking errors using such a reflection type grating lens comprising diffraction elements, a fluctuation in a wavelength of a semiconductor laser changes an angle of diffraction, thereby resulting in a deviation in the position of diffracted beam on a photodetector element. It is therefore required to take a necessary step for the fluctuation in an oscillating wavelength of a semiconductor laser. We discuss this position fluctuation in regard to first and second directions in which the first direction is a direction parallel to the first dividing line 47, and the second direction is a normal to the second dividing line 48. The positional change in the direction parallel to the first dividing line 47 may be left out of consideration unless it crosses over the second dividing line 48, and gets out of the photodetector 34. With respect to the positional change in the direction normal to the first dividing line 47, it is required to take a necessary step in a conventional optical head because the outputs of the central four photodetector elements 28, 29, 30 and 31 in the six-divided photodetector 34 change. In the invention, however, the domains A and B of the reflection type grating lens 23 have hardly a spatial frequency in that direction, so that the positional change of diffracted beam in the direction can be disregarded.

A system for detecting a tracking error in which a push-pull method is employed to move a focusing lens for the correction of the tracking error, the optical axis of an optical system on an error detecting side may deviate from the optical axis on a lens side, thereby producing a difference in quantity of light received in a photodetector for detecting a tracking error, so that an offset is induced in a signal of the tracking error. In this point, the present invention solves this problem as follows: The reflection type grating lenses 41 and 42 for the domains C and D are of an equal area and arranged symmetrically in regard to an optical axis to detect light beam from the beam splitter 5. Therefore, even if the optical axis of the focusing lens relative to the optical axis of the error detecting system is deviated toward the direction normal to a track on the disk 8, there is no change in quantity of light received in the reflection type grating lens 41 and 42 for the domains C and D, so that the occurrence of offset in tracking error signals can be prevented.

In this embodiment, the first dividing line 47 of the six-divided photodetector 34 is normal to the direction of a track on the disk 8. However, this arrangement of the six-divided photodetector 34 may be changed. For example, the six-divided photodetector may be rotated in regard to an optical axis of incident light for the reflection type grating lens 23 by an arbitrary angle along with the dividing line 38 of the reflection type grating lens 23.

Furthermore, if beam 37 diffracted from the reflection type grating lens 41 of the domain C and beam 36 diffracted from the reflection type grating lens 42 of the domain D are detected separately, the arrangement of the photodetector elements 32 and 33 are not limited to that shown in FIGS. 2 and 3.

Here, principle and operation of the invention will be explained in more detail.

As described above, in an optical head according to the invention, a reflection type grating lens is used. The reflection type grating lens is a device or element, a reflecting surface of which has conductivity. For example, the surface of the grating is coated with an electric conductor such as aluminum, gold, etc.

In addition to the diffraction of the first-order diffraction light, the reflection type grating lens reflects the zero-order diffracted light directly. A RF signal can be obtained by receiving the zero-order diffracted light. A read signal from a disk includes a very small component of signal polarized light. Therefore, the zero-order diffraction light which is incident to a RF signal receiving system is desired to include a large component of signal polarized light as much as possible. That is, it is desired to use a reflection type grating lens which does not diffract such a signal polarized light component. For this purpose, the invention adopts a grating having a ratio of a wavelength to a groove spacing (pitch): $\lambda/d \approx 0.5$ or $\lambda/d \geq 1.2$, where $\approx$ is a wavelength, and d is a groove spacing.

FIGS. 5 to 10 show $\lambda/d$ dependent characteristics of reflection type diffraction efficiencies for reflection type diffraction gratings each having rectangular grooves. These data are reported in the following paper: E. G. Loewen, et al., "Efficiency optimization of rectangular groove gratings for use in the visible and IR regions", Applied Optics, Vol. 18, No. 3, pp. 2262-2266 (1979).

Figure 5:
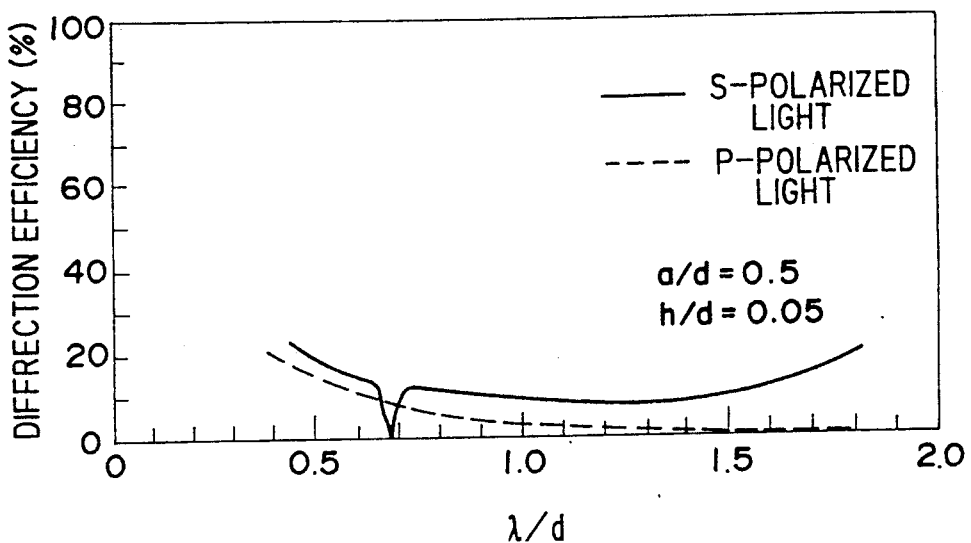
FIGS. 5 to 10 show diffraction efficiency curves for a reflection type grating lens dependent on a wavelength to groove spacing ratio, respectively.
Figure 6:
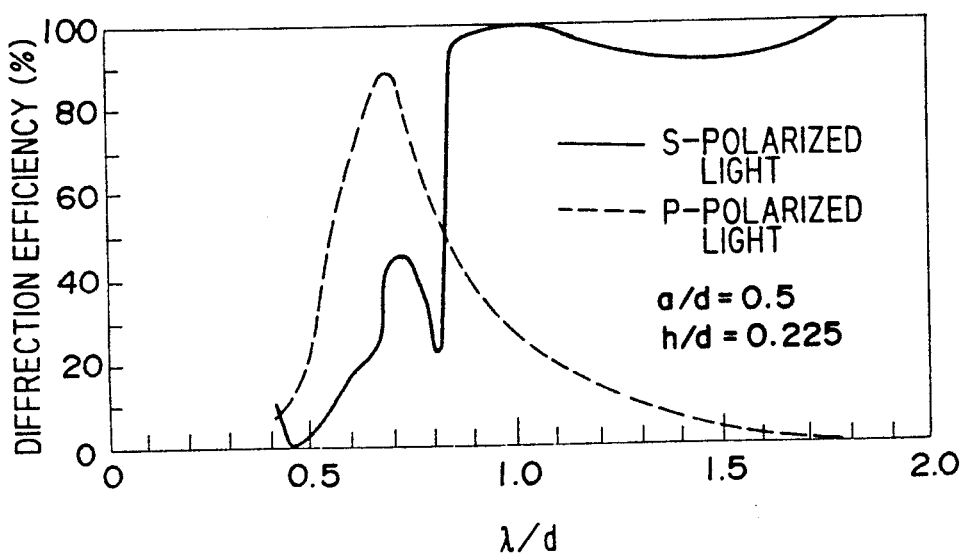
Figure 7:
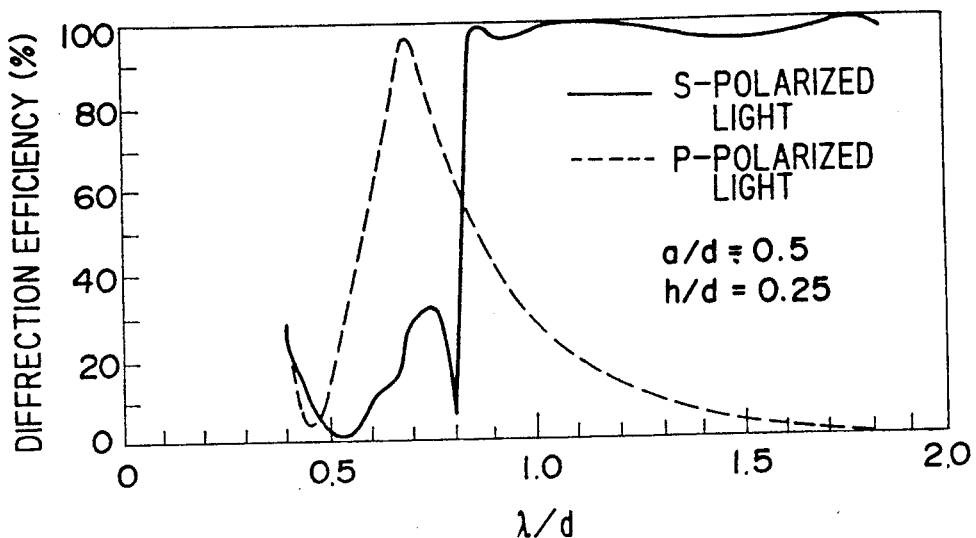
Figure 8:
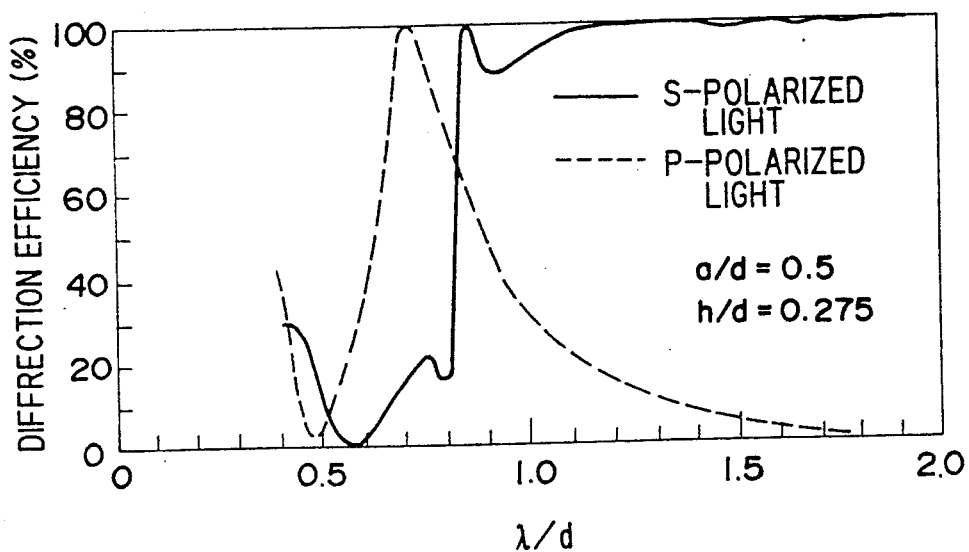
Figure 9:
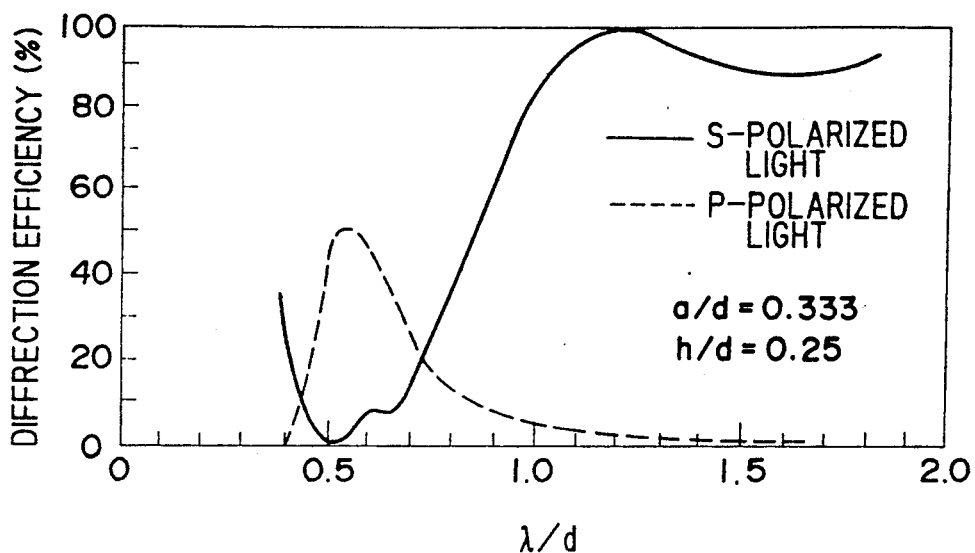
Figure 10:
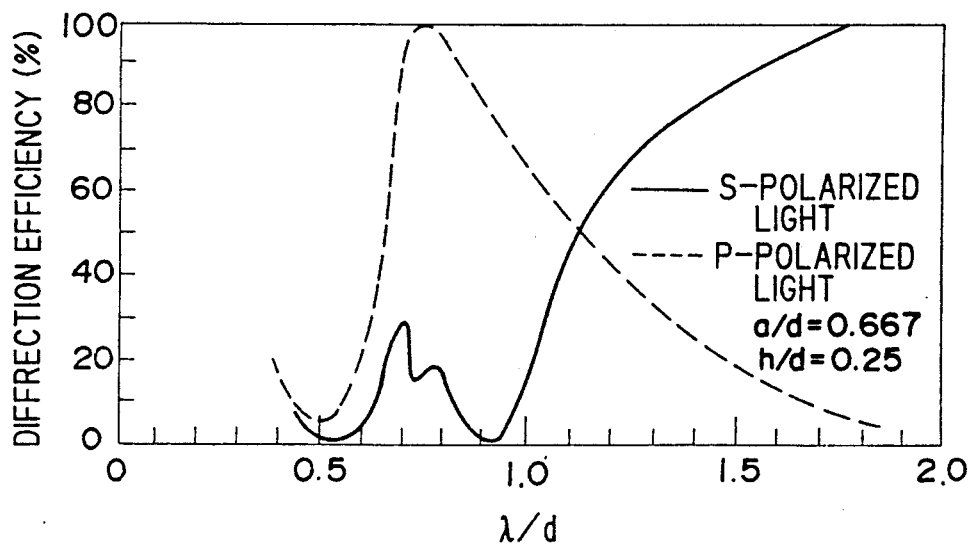

In FIGS. 5 to 10, a/d is a ratio of a groove width "a" to a groove spacing "d", and h/d is a ratio of a groove depth "h" to the groove spacing "d". In a grating as shown in FIG. 5, the diffraction efficiency of P-polarized light comes to nearly zero at $\lambda/d \geq 1.2$. Therefore, it is preferable to utilize P-polarized light as a signal polarized light component. In gratings as shown in FIGS. 6 to 10, the diffraction efficiency of S-polarized light comes to zero at the vicinity of $\lambda/d = 0.5$ and thus, it is preferable to utilize S-polarized light as a signal polarized light component. Further, in a grating as shown in FIG. 8, the diffraction efficiency of P-polarized light comes to nearly zero at the vicinity of $\lambda/d = 0.48$ and thus, P-polarized light may also be utilized as a signal polarized light component. Similarly, in the grating as shown in FIG. 7, P-polarized light may also be utilized as a signal polarized light component because P-polarized light comes to zero at the vicinity of $\lambda/d = 0.4$.

Furthermore, in the present invention, in order to obtain a focusing error signal by the first-order diffraction light, the reflection type grating lens is divided into two domains having different characteristics from each other, thereby permitting a border line to provide an action equivalent to that of a knife edge used in a conventional optical head.

A tracking error signal can also be obtained by forming two domains having gratings disposed in different directions from each other at the respective positions lightly separated from the center point at which an optical axis of a collimating lens intersects with the grating lens, wherein intensities of light beams diffracted from these two domains are compared according to the principle of a push-pull method.

A RF signal can be detected by a differential detecting method. A magnetooptical disk system utilizes Kerr effect by which a plane of polarization is rotated to read informations from a disk.

Figure 11:
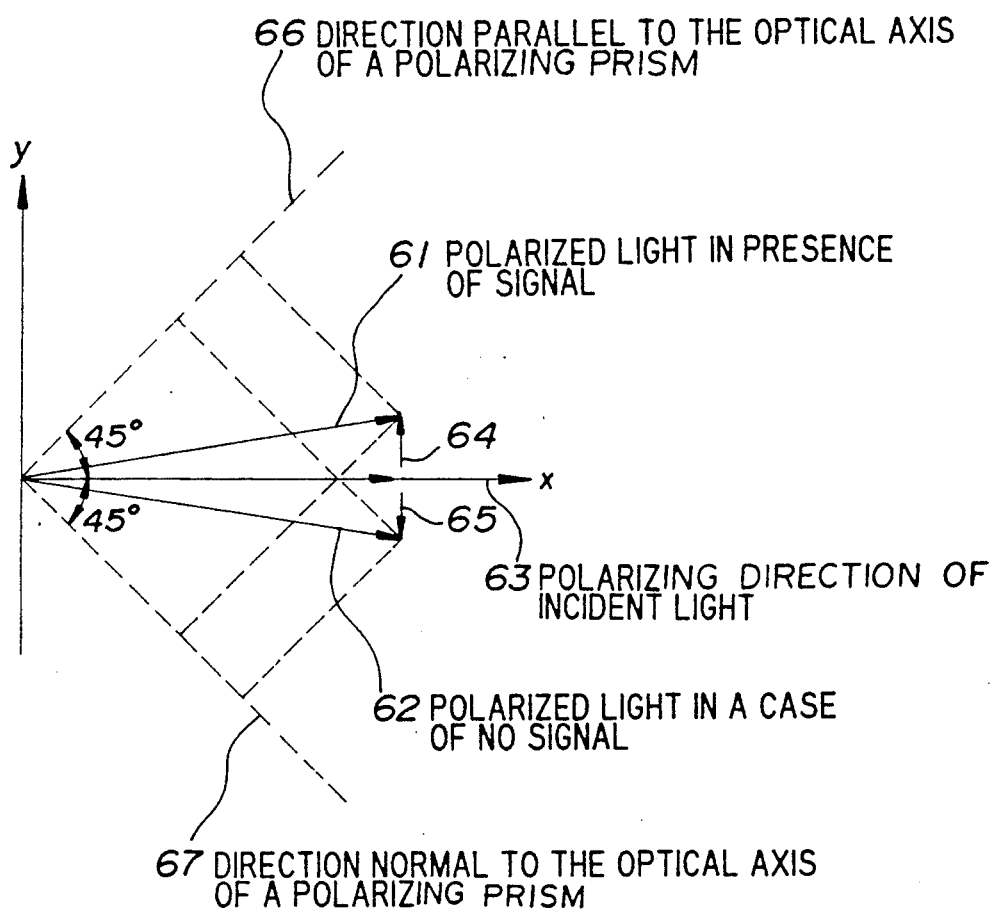
FIG. 11 is an explanatory view showing the states of polarized lights reflected on a magnetooptical disk.

FIG. 11 shows the states of polarized lights both before and after being reflected from a disk. The polarization plane of light reflected from the disk is rotated relative to the polarization plane of incident light. The direction of this rotation depends on the existence of a recorded signal. The angle of this rotation is very small and is of the order of about 0.2 degrees, and the signal polarized light components 64 and 65 produced by this rotation is small. In order to obtain a high C/N ratio of regenerative signal from this small signal component, it is required to transmit the signal polarized light components 64 and 65 to a signal system with a low loss and to provide a detecting method having an improved efficiency.

Accordingly, in order to transmit the signal polarized light components 64 and 65 to the signal system with a low loss, the present invitation utilizes a reflection type grating lens having a polarized light dependence on the diffraction efficiency described above. A method of differential detection is a useful means as a method of detection. In this method of differential detection, a polarizing prism, which has an optical axis inclined relative to X axis by 45°, is inserted between a grating lens and a two-divided photodetector, so that signal polarized light beams 61 and 62 are divided to two components, respectively, one of which is in a direction 66 parallel to this optical axis of the polarizing prism, and the other of which is in a direction 67 normal to the optical axis, and the divided signals are transmitted to the two-divided photodetector, correspondingly. The RF signals can be obtained from the difference between these two signal voltages. This method of detection has a features in which such signals can be obtained efficiently, and noise of in-phase component can be eliminated.

As apparent from the above, the reflection type grating lens according to the present invention has a function of a reflection-diffraction type beam splitter by which incident light is divided into a RF signal light, a focusing error detecting signal light, and a tracking error detecting signal light. The optical head according to the invention can therefore have a small number of parts, and is simple in adjustment, and thus a miniaturized, lightened and inexpensive optical head can be obtained.

Figure 12:
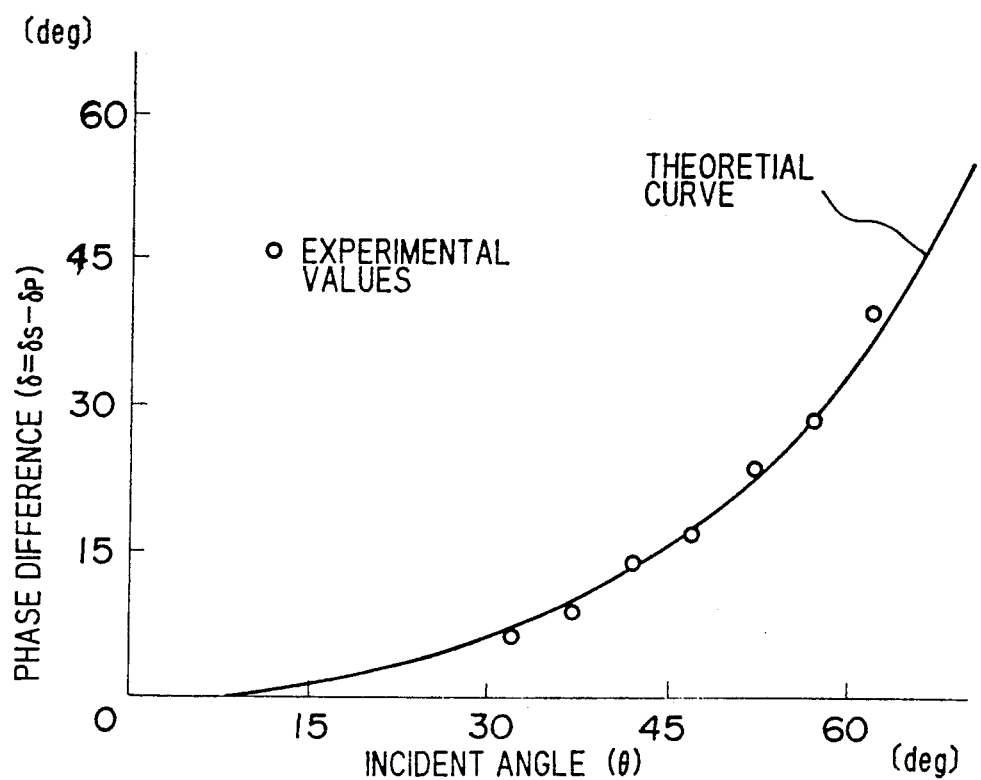
FIG. 12 is a curve plotting a phase difference between polarized lights dependent on an incident angle.

Further, the present invention adopts an optical construction to compensate a phase difference between polarized beams produced by a reflection type grating lens. When the surface of a grating lens is coated with a metal film, polarized light parallel to a direction of grooves of the grating lens differs in phase changes after reflection from polarized light perpendicular to the direction of the grooves, thereby resulting in a phase difference therebetween. FIG. 12 shows the phase difference between such polarized beams dependent on an incident angle to a reflection plane, when the surface of a grating lens is coated with gold film. When an incident angle is 60°, the grating lens produces a phase difference of 45° which is slightly greater than a value in a case of a mere metal surface. When the grating lens is used in an optical head, the signal polarized light component 64 produced by Kerr effect shown in FIG. 11 is coincident with the polarized component 65 perpendicular to the component in the direction of polarization described above, so that a C/N ratio of regenerated signal is lowered due to a phase difference produced by reflection.

Figure 13:
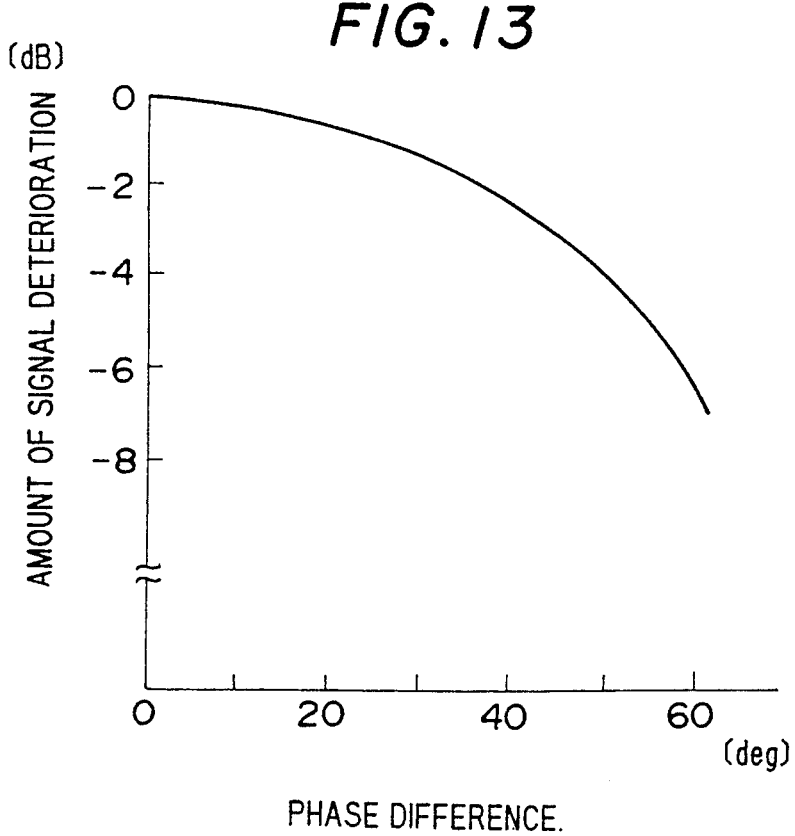
FIG. 13 shows a curve of a signal deterioration dependent on a phase difference between polarized lights.

FIG. 13 shows a relationship between such a phase difference (degrees) and an amount of signal deterioration (dB). Regenerated signal at a phase difference of 90° can not be detected. Accordingly, it is necessary to insert a phase compensating plate capable of compensating a phase difference produced by reflection on a metal coated grating lens. However, when a transmission type phase compensating plate using a double refracting crystal such as crystallized quartz is used for a phase compensating means, it is difficult to provide a compact optical system for an optical head.

Figure 14:
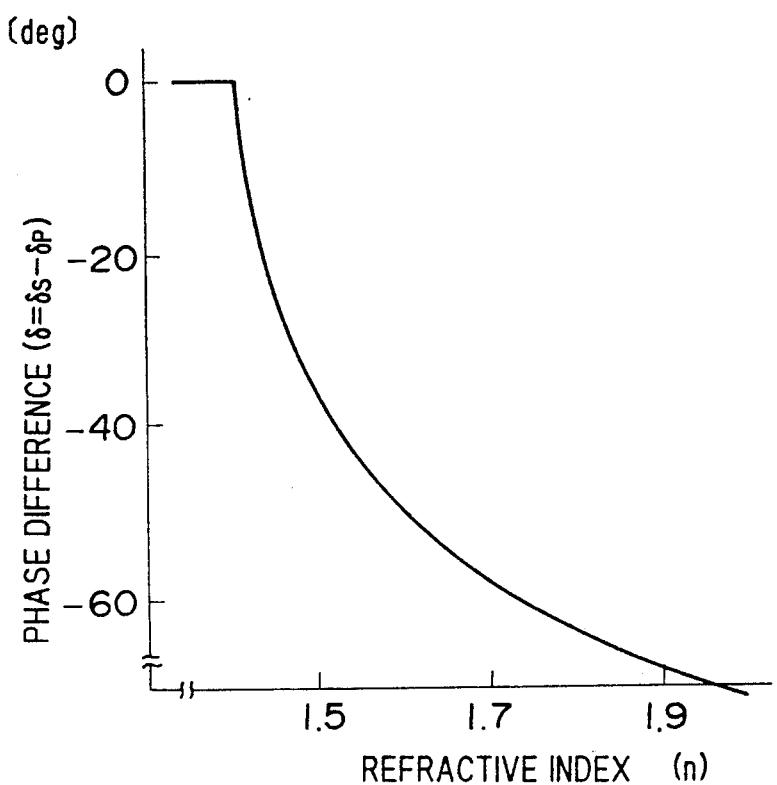
FIG. 14 is a curve plotting a phase difference dependent on a refractive index of a total reflection prism.
Figure 15:
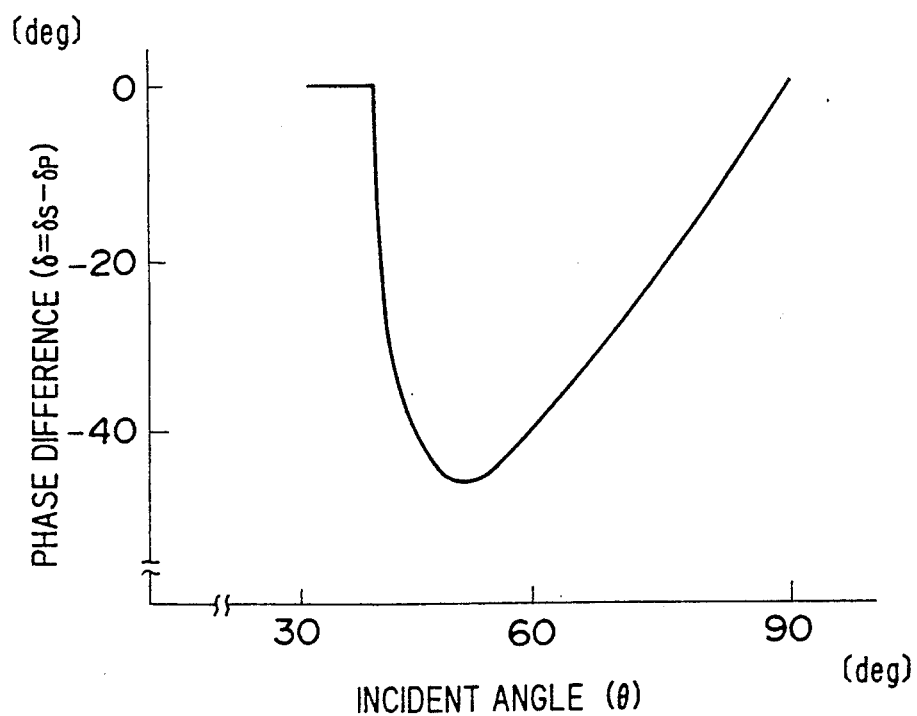
FIG. 15 is a curve plotting a phase difference dependent on an incident angle.

For this reason, the present invention adopts a total reflection prism for a phase compensation means. When light is incident from a high refractive index member to an interface of a low refractive index member by an incident angle more than a critical angle, this total reflection prism provides total reflection of the light, so that phase jumps of different values are generated in P and S-polarized lights. A phase compensation is realized in accordance with the phenomenon. For example, FIG. 14 shows a curve of a phase difference between P and S-polarized lights dependent on a refractive index in which an incident angle is constant at 45°, and FIG. 15 shows a curve of the phase difference dependent on an incident angle in which the refractive index is constant at 1.5. This total reflection prism is of a reflection type, so that an optical system of an optical head can be folded up for providing a compact optical head device.

Figure 16:
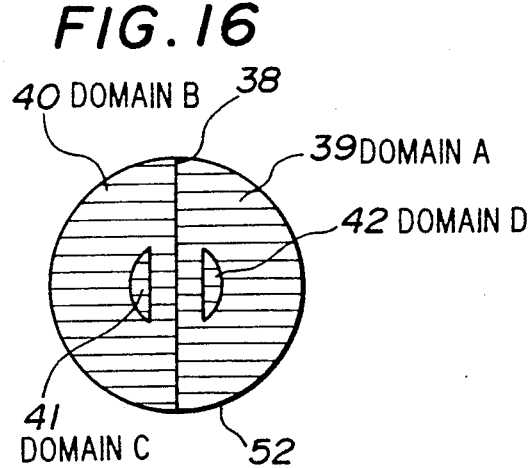
FIG. 16 is a explanatory view showing a reflection type grating lens in a second embodiment according to the invention.

Referring to FIG. 16, there is shown a reflection type grating lens 52 in a second embodiment according to the present invention. In the second embodiment, a dividing line 38 of the reflection type grating lens 52 is rotated relative to that in the first embodiment by 90° as apparent from a comparison with FIGS. 2 and 3. The relation between the grating lens 52 and the six-divided photodetector 34 is the same as that of the first embodiment. That is, as shown in FIG. 3, beams diffracted from the reflection type grating lenses 39 and 40 are focused on the points 43 and 44 on the six-divided photodetector 34 respectively, and beams diffracted from the reflected from the reflection type grating lenses 41 and 42 are focused on the points 45 and 46 on the six-divided photodetector 34 respectively.

Figure 17:
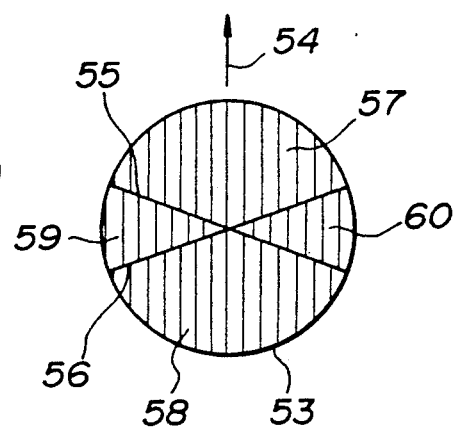
FIG. 17 is a explanatory view showing a reflection type grating lens in a third embodiment according to the invention.

FIG. 17 shows a reflection type grating lens in a third embodiment according to the present invention. The reflection type grating lens 53 is divided into four domains 57, 58, 59 and 60, which correspond to the domains A, B, C and D in the first embodiment, by two border lines 55 and 56. Therefore, this grating lens 53 can perform the same function as that of the first embodiment by setting a direction of optical disk tracks in a direction of an arrow 54.

Figure 18:
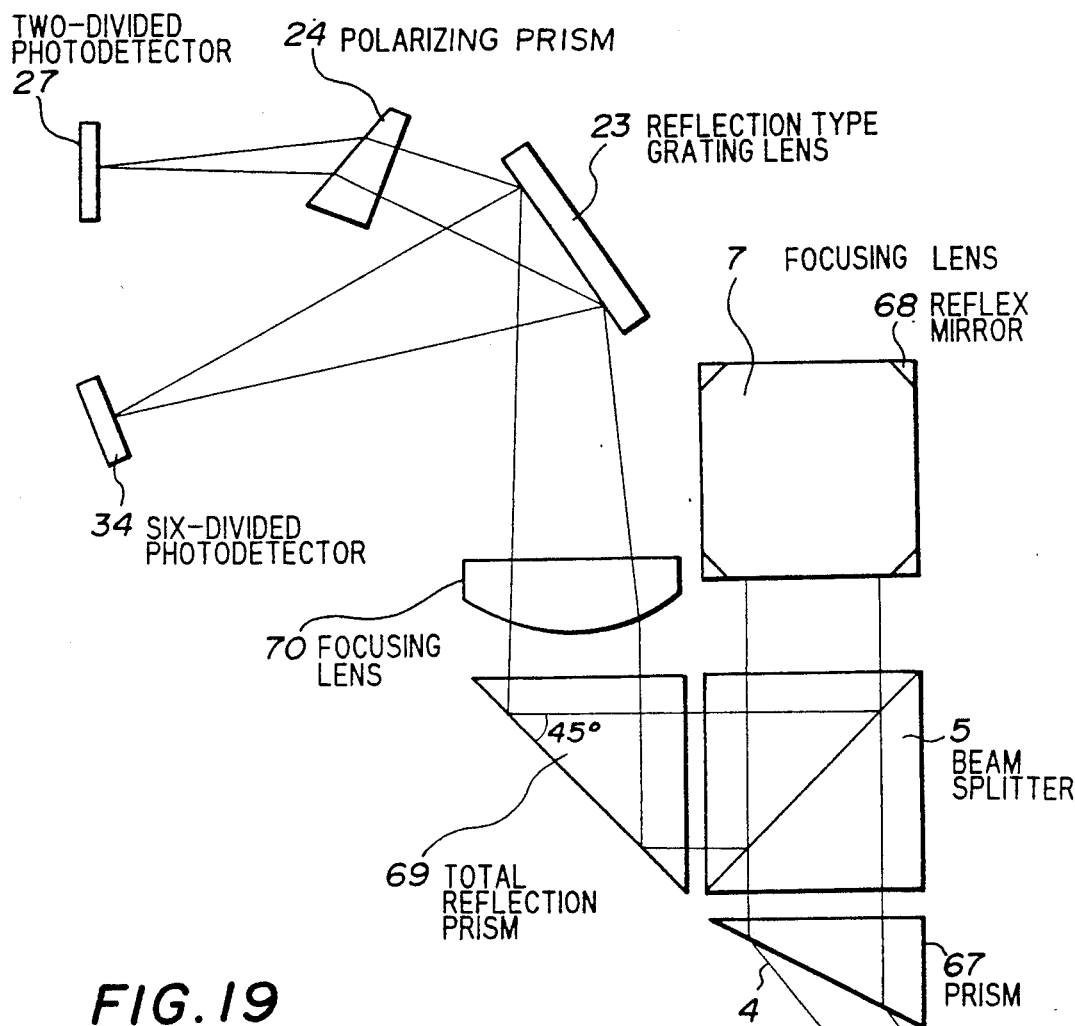
FIG. 18 is a plan view showing a fourth embodiment according to the invention.

FIG. 18 shows a fourth embodiment of an optical head according to the present invention, in which like numerals indicate like elements in FIG. 2. In this embodiment, beam is projected up in a direction perpendicular to the surface of the drawings to a disk (not shown) by a reflex mirror 68 in a focusing lens 7. A reflection type grating lens 23 has the surface having a grating pitch of 1.4 $\mu$m and a grating depth of 0.14 $\mu$m and coated with gold film. Light is incident to this grating lens 23 with an incident angle of 60°, and polarized light component orthogonal to grating grooves thereof is diffracted by only 20%, while polarized light component parallel to another grating grooves thereof is little diffracted to be reflected as the zero-order diffraction light with a low loss. Accordingly, where signal polarized light component is made parallel to a direction of the grating grooves, a two-divided photodetector element 27 can receive signal light for a RF signal with a low loss, and tracking and focusing signals can be detected in accordance with 20% of the light diffracted based on the polarized light component perpendicular to the grating lens.

In this embodiment, a phase difference between polarized lights is compensated in reflection of light supplied from a polarizing beam splitter 5 by a total reflection prism 69. The total reflection prism 69 corresponds to the former means of the two means as described in the explanation of principle and operation. Where an incident angle is 45°, the total reflection prism 69 is of a glass having a refractive index of 1.55 to obtain a phase difference of 45° produced by a reflection type grating lens 23. In FIG. 18, reference numeral 67 is a prism, and 70 a focusing lens.

Figure 19:
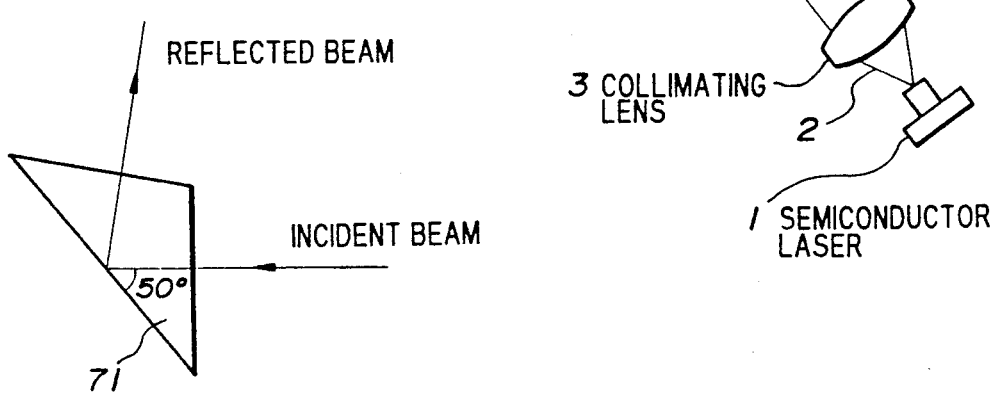
FIG. 19 is a plan view showing a fifth embodiment according to the invention.

FIG. 19 shows a total reflection prism 71 in a fifth embodiment according to the present invention which corresponds to the latter means of the two means described in the explanation of principle and operation. In this embodiment, in order to obtain a phase difference of 45°, an incident angle of 50° is employed using a glass prism having a refractive index of 1.5.

These phase compensating means may be disposed in a specific position selected in a light path between a focusing lens 7 and a polarized prism 24.

As described in detail, in an optical head according to the present invention, an optical part of a light receiving system comprises only a reflection type grating lens and a polarizing prism, so that a number of parts used in a conventional optical head is remarkably reduced to make the size of the optical head small. Since the reflection type grating lens used in the present invention is a surface concave-convex type device, a replica of the device can easily be obtained in a hot press or photopolymerization process, or the like by use of a metal mold, so that such a reflection type grating lens can be mass-produced inexpensively.

Further, in the present invention, the grating lens is provided with domains C and D to obtain a tracking error signal, so that a tracking offset due to the movement of a focusing lens does not occur. Still further, since the reflection type grating lens functions as a beam splitter, a RF signal and tracking and focusing error signals have only a slight interference thereamong. Therefore, servomotor is stable.

Furthermore, the optical head of the present invention utilizes a total reflection prism as a phase compensating means, so that a compact optical head is obtained. In addition, an inexpensive glass can be utilized for the total reflection prism, and thus it is possible to provide an inexpensive optical head.

Although the invention has been described with respect to specific embodiments for complete and clear disclosure, the appended claims are not to be thus limited but are to be construed as embodying all modifications and alternative construction that may occur to one skilled in the art which fairly fall within the basic teaching herein set forth.

What is claimed is:

1. An optical head comprising;
    means for radiating a light beam;
    a beam splitter for transmitting said light beam therethrough and reflecting light beam reflected from a disk;
    a focusing lens for focusing said light beam on said disk and transmitting light beam reflected from said disk therethrough;
    a reflection type grating lens including a plurality of regions having different optical properties for diffracting mainly specified polarized light included in said light beam from said beam splitter;
    means for detecting a signal stored in said disk in accordance with said reflected light of said reflection type grating lens; and
    means for detecting a focusing error signal and a tracking error signal in accordance with said diffracted light of said reflection type grating lens.

2. An optical head according to claim 1 further comprising,
    a polarizing prism for dividing the zero-order diffraction light supplied from said reflection type grating lens into two polarized lights orthogonal to each other in polarizations thereof.

3. An optical head according to claim 2 further comprising,
    a total reflection prism for compensating a phase difference between polarized lights orthogonal to a grating groove of said reflection type grating lens and parallel thereto, said total reflection prism being provided at a specific position on a light path between said focusing lens and said polarizing prism.

4. An optical head according to claim 1,
    wherein said means for detecting a signal comprises a two-divided photodetector.

5. An optical head according to claim 1, wherein said means for detecting a focusing error signal and a tracking error signal comprises a six-divided photodetector.

6. An optical head comprising:
   means for radiating a light beam;
   a beam splitter for transmitting said light beam therethrough and reflecting light beam reflected from a disk;
   a focusing lens for focusing said light beam on said disk and transmitting light beam reflected from said disk therethrough;
   a reflection type grating lens including a plurality of different optical properties for dividing specified polarized lights included in said light beam from said beam splitter into reflected and diffracted lights;
   a polarizing prism for dividing the zero-order diffraction light supplied from said reflection type grating lens into two polarized lights orthogonal to each other in polarizations thereof;
   means for detecting a signal stored in said disk in accordance with said reflected light of said reflection type grating lens; and
   means for detecting a focusing error signal and a tracking error signal in accordance with said diffracted light of said reflection type grating lens.

7. An optical head comprising:
   means for radiating a light beam;
   a beam splitter for transmitting said light beam therethrough and reflecting light beam reflected from a disk;
   a focusing lens for focusing said light beam on said disk and transmitting light beam reflected from said disk therethrough;
   a reflection type grating lens including a plurality of different optical properties for dividing specified polarized lights included in said light beam from said beam splitter into reflected and diffracted lights;
   a polarizing prism for dividing the zero-order diffraction light supplied from said reflection type grating lens into two polarized lights orthogonal to each other in polarizations thereof;
   a total reflection prism for compensating a phase difference between polarized lights orthogonal to a grating groove of said reflection type grating lens and parallel thereto, said total reflection prism being provided at a specific position on a light path between said focusing lens and said polarizing prism;
   means for detecting a signal stored in said disk in accordance with said reflected light of said reflection type grating lens; and
   means for detecting a focusing error signal and a tracking error signal in accordance with said diffracted light of said reflection type grating lens.

* * * * *

UNITED STATES PATENT AND TRADEMARK OFFICE
CERTIFICATE OF CORRECTION

PATENT NO. : 5,036,504
DATED : July 30, 1991
INVENTOR(S) : Yuzo ONO; Akitomo OHBA and Yasuo KIMURA It is certified that error appears in the above-identified patent and that said Letters Patent is hereby corrected as shown below:

Col. 6, line 61, after "where" insert --$\lambda$--.

Col. 6, line 61, "$\sim$" should be deleted

Signed and Sealed this

Twenty-fourth Day of November, 1992

Attest:

DOUGLAS B. COMER

Attesting Officer

Acting Commissioner of Patents and Trademarks